United States Patent
Satake et al.

[11] Patent Number: 5,838,135
[45] Date of Patent: Nov. 17, 1998

[54] DRIVING MEANS FORMED BY INDUCTION MOTOR AND METHOD FOR STARTING THE SAME

[75] Inventors: Satoru Satake, Tokyo; Manabu Hidaka, Hiroshima; Kazuo Kumamoto, Hiroshima; Tadashi Masaki, Hiroshima, all of Japan

[73] Assignee: Satake Corporation, Japan

[21] Appl. No.: 767,785

[22] Filed: Dec. 17, 1996

[30] Foreign Application Priority Data

Dec. 22, 1995 [JP] Japan ................... 7-350555

[51] Int. Cl.⁶ .................... H02K 16/00; H02K 17/12
[52] U.S. Cl. ................ 318/771; 318/778; 310/112
[58] Field of Search ................ 318/771, 778, 318/779, 45, 49, 50, 727, 767; 310/112, 114

[56] References Cited

U.S. PATENT DOCUMENTS

| | | |
|---|---|---|
| 4,228,391 | 10/1980 | Owen . |
| 5,051,639 | 9/1991 | Satake et al. .......................... 310/112 |
| 5,068,559 | 11/1991 | Satake et al. .......................... 310/112 |
| 5,357,180 | 10/1994 | Speicher .................................. 318/49 |

FOREIGN PATENT DOCUMENTS

| | | |
|---|---|---|
| 0 088 200 A1 | 9/1983 | European Pat. Off. . |
| 0 238 940 A1 | 9/1987 | European Pat. Off. . |
| 0 421 656 A1 | 4/1991 | European Pat. Off. . |
| 0 570 582 A1 | 11/1993 | European Pat. Off. . |
| 354 837 | 7/1961 | Switzerland . |

OTHER PUBLICATIONS

K. Bystron, "Starting of Three–Phase Induction Motors", Mar. 1985, Berlin, DE, vol. 5, No. 1, pp. 10–11.

*Primary Examiner*—Bentsu Ro
*Attorney, Agent, or Firm*—Fish & Richardson PC

[57] ABSTRACT

An induction motor as driving apparatus includes two stators in which two rotor cores each formed in a squirrel cage type are rotatably mounted on a common rotary axis; two stators which respectively surround the two rotors and on which stator windings are respectively wound; and a switching device which supplies power by sequentially switching between one side of either the one stator winding or the other stator winding and both the sides of the two stator windings. Starting characteristics and operation characteristics of an induction motor are improved thereby enlarging applications of the induction motor, enhancing operation efficiency, and reducing power consumption.

3 Claims, 6 Drawing Sheets

DRIVING MEANS FORMED BY INDUCTION MOTOR AND METHOD FOR STARTING THE SAME

BACKGROUND OF THE INVENTION (1) Field of the Invention

The present invention relates to a driving means which is formed by a single induction motor integrally having two stators and two rotors, or which is formed by two induction motors for driving a common load, and a method for starting the operation of such driving means.

(2) Description of the Related Art

Generally, there have been known a line-starting method and a star-delta connection method as the starting method of an induction motor for driving a load. The line-starting method achieves a sufficient torque but, on the other hand, a large current flows at the starting operation in the case of a large capacity motor so that the electrical installation cost is inevitably very large. In the case where the star-delta starter is used, although the current at the starting operation can be limited to be low, the starting torque is also lowered. Because the starting torque is lowered, it becomes necessary to use a larger capacity induction motor, resulting in raising the cost of the induction motor. Here, with respect to the case where a star-delta starter of a general kind is used, the resulting torque, current and input characteristics are shown in FIGS. 9, 10 and 11.

Methods for starting an induction motor have been disclosed in, for example, Japanese Patent Application Kokai Publication Nos. Sho 51-104513 and Sho 52-54112, and a number of methods for starting the motor by appropriately switching the stator windings between the star- and delta connection are known. In these methods, the stator windings are constituted by a plurality of circuits (windings) and, during the starting operation, the starting current is controlled to be low by the switching of these windings respectively to star-connections or delta-connections.

Each of the above described methods enables the limiting of the starting current but it remains as a star-delta starting method so that, due to the reduction of the starting current, the starting torque is inevitably lowered. Thus, the device that employs the star-delta starting cannot be applied other than to such loads as a load having square-law decreasing characteristics in which a load is smaller than the starting torque in the star-connections for the star-delta starting so that, although the motor is an induction motor, its application is limited to and the motor cannot serve as a general purpose induction motor. Further, the induction motor employing the above starting methods lacks characteristics of intermediate torque which is larger than the starting torque and which enables the continuous operation.

In a prior art example wherein there are a plurality of individual stator windings provided on a single stator-core, when power is supplied only to one of these stator windings, the deterioration in magnetomotive force waves is caused, resulting in various defects such as fluctuations of torque characteristics, starting failure, and lowered operation efficiency, and the resulting structure cannot be used in practice.

The induction motor that is started by the line-starting method is used mostly for a load in which a load is very small or an inertia is large, and thus it embodies a method that is dictated by the starting torque of the induction motor. However, the period in which the load having a large inertia requires a large torque is up to the time when the rotation speed reaches its rated speed. Once the rated rotation speed is reached, the rotation speed is unlikely to change especially because of the large inertia so that a smaller torque is sufficient after the starting operation. However, despite the fact that only the small torque is needed subsequent to the starting, the output cannot be lowered after the starting only because the induction motor is of the line-starting type and, under the existing state, unnecessary power is being wasted. Thus, there is a demand for the development of a driving device by an induction motor and a method for starting the same in which the starting current is reduced during the starting operation and yet to generate a large torque, and which enables the power-saved operation during the rated operation. To meet this demand, a starting compensator operation (condorfer starting) and, recently, an inverter starting operation are available, but each of these involves a device with a very large cost.

The induction motor is often used by being connected to an emergency electric generating installation. The induction motor is then used as a motor for driving an emergency fire extinguishing installation such as a pump. As to a prime mover constituting a private power generating installation for emergency purposes and a generator driven by the prime mover, the size of the prime mover and the capacity of the generator are selected based on a coefficient which is calculated on a load current change rate and an input change rate with respect to the motor rating during the starting operation period from the time when the motor which becomes the load of the electric generating installation starts to the time when the rated operation speed is reached. Therefore, as a matter of course, a study has been made not only for reducing starting current during the starting operation but also for reducing the rates of load current and input variations in the star-delta switching during the starting operation. This is because, by the reduction of the required capacity of the generator and the prime mover, it is possible to reduce the installation cost.

Also, the fire extinguishing installation such as a pump which is operated in an emergency is one in which the time required for reaching the rated operation is made as short as possible. To this end, it is desired that an induction motor as a driving apparatus be developed in which, while the load current change rate and the input change rate are given due consideration, the starting torque is made large and the starting operation period is made short to the fullest extent, and yet the structure of the apparatus be made simpler as possible. The starting methods with which the attempt has been made to realize the desire includes a closed star-delta starting, a reactor starting, and a condorfer starting including a special type of condorfer starting.

Where the induction motor is used in, for example, a compressor in which the operation is frequently started and stopped or undergoes frequent changes between high and low loads, the induction motor repeats frequent stopping and re-starting operations and, due to the starting current during the re-starting operation, the induction motor suffers from an intense rise of temperature thus causing the motor to become inoperable. In a large induction motor, a star-delta starting operation has been used in order to limit the starting current during the starting period, but the star-starting frequently fails the re-starting because of the low starting torque, and this requires the use of an induction motor of a higher ranking in its capacity. Also, for driving a compressor, an unload type motor is available in which the motor is constantly rotating and unnecessary air is appropriately being exhausted but, since the motor is constantly rotated, the running cost becomes high.

For the above reasons, each of the conventional induction motors as described above has been such that unnecessary power is consumed because of a large inertia or that, although the motor is for general purposes, a special starting device is required in order to limit the starting current, and this has rendered the motor to be that for special use and no longer that for general purposes. Thus, there has been a demand for the development of technology enabling the provision of an induction motor as a driving apparatus which is low in cost and which, as a motor that can cope with a large inertia without requiring any such special high cost starting device as required in general purpose motor, as a motor that can be used in a private power generating installation, and as a motor that can be used in a compressor that repeats starting and stopping operations and is differently used depending on a loaded state and an unloaded state, can be used efficiently for any purposes while fully exhibiting its capability as an induction motor.

The selection of an output of an ordinary general purpose induction motor which is constituted by a single rotor and a single stator and which has characteristics of the starting torque being smaller than those of the rated torque, is not based on the rated torque as reference but is based on the starting torque of the induction motor with reference to the load torque and, especially when the motor is star-delta started, the starting torque inevitably becomes small thereby requiring a kind of motor whose output is of a higher ranking, that is, a higher capacity. This requirement is more conspicuous when the load during the starting operation is high. Thus, there is a demand for techniques for developing an induction motor as a driving apparatus and a method for starting the operation of the same, which is constituted by a general purpose induction motor but which can be used in connection with a variety of loads without the need of selecting a kind of induction motor in which its output is unnecessarily ranked up.

SUMMARY OF THE INVENTION

Therefore, an object of the invention is to overcome the problems existing in the conventional driving means and to provide an improved driving means in which starting characteristics and operation characteristics of an induction motor are improved.

According to an aspect of the invention, there is provided a method for supplying power to an induction motor having a first power generation means constituted by a first rotor and a first stator which surrounds the first rotor and on which a first stator winding is wound and a second power generation means constituted by a second rotor and a second stator which surrounds the second rotor and on which a second stator winding is wound, the first and second power generation means being connected to a common load, the method comprising the following sequential steps:

a first step of supplying power to the first and second stator windings after both the windings are respectively connected in a star-form;

a second step of supplying power to the first and second stator windings after a connection of the second stator winding is changed into a delta-form while a connection of the first stator winding remains as the star-form; and a third step of supplying power to the first and second stator windings after the connection of the first stator winding is changed into a delta-form while the connection of the second stator winding remains as the delta-form.

According to another aspect of the invention, the induction motor may comprise a first induction motor formed by the first rotor and the first stator and a second induction motor formed by the second rotor and the second stator.

Also, a switching device is arranged such that both the stator windings can respectively be switched over between star connections and delta connections with respect to the power source.

With the above described switching device, it is possible to provide, at low cost, means which can be used when, for example, a load has a large inertia or it is needed to make small the magnitude of current/input changes during the connection switching. This is made possible either by a starting method in which firstly the power supplying is made by respectively delta-connecting the two stator windings and, after the rated rotation speed is reached, one of the stator windings is star-connected or delta-connected and the power supplying is made to the one of the stator windings, or by a starting method in which firstly the power supplying is made by respectively star-connecting the two stator windings, secondly one of the stator windings is delta-connected, and thirdly the power supplying is made by respectively delta connecting the two stator windings.

Further, with the switching device, the starting operation can be carried out wherein the two stator windings are respectively delta-connected and the switching is made between the power supplying to the two stator windings and the power supplying to one of them. This can be effectively applied to a load which repeats the rotation and stopping operations or a load which changes between a high load and a low load.

First, since the induction motor as the driving apparatus according to the invention comprises two squirrel cage type rotors which are rotatable on a common rotary axis, two stators which respectively surround the two rotors and on which stator windings are wound, and a switching device which supplies power by sequentially switching between one and the other of the stator windings or switching to one of the stator windings, it is possible to use this induction motor as a general purpose induction motor, which can be operated in a power saving manner after a line-starting operation, or can make a star-delta starting operation. Moreover, since there are provided two sets of the stators and two sets of the rotors, the supplying power only to one of the sets thereof enables the continuous operation with an intermediate torque. This has not readily been realized by the conventional induction motor.

The induction motor structure as the driving apparatus according to the invention comprises two induction motors which are connected for driving a common load and a switching device which supplies power by sequentially switching between stator windings of one of the two induction motors and stator windings of the other of the two induction motors, or switching to the stator windings of either of the two induction motors. Thus, not only is it possible to use each of the motors, as it is, as general purpose induction motor, it is possible to make the starting with one of the induction motors as a line-starting operation, in which case the starting torque of this one induction motor becomes larger than when an induction motor having the same total output as two of such induction motors is star-delta connected for the starting operation. Also, in no cases will the starting current exceed the rated current as being the total of the two induction motors.

The switching device is so arranged that both the stator windings can switched over between the star-connections and the delta-connections with respect to the power source, and this enables the induction motor as the driving device to cope with all kinds of load torques. Moreover, this switching device can be constructed using a simple switch having a capacity about half that of a conventional switch, with the number of such switches being only two to five and also the rating being half that of the conventional switch, thus enabling the realization of the switching device at a low cost. Other functions, for example, the switching control of the switching device which is made by sequential switching based on such values as the number of revolutions, time periods and load torques, can be realized by conventional techniques.

The starting operation method using the switching device, in which firstly two stator windings are parallel delta-connected and the power is supplied to both the stator windings and, after the rated number of revolutions is reached, one of the stator windings is star-connected or delta-connected with the power supplying being made only to the one of the stator windings, is suited to the starting operation and the subsequent operation when the load has a large inertia. A machine such as a press or a crusher requires a large torque for the starting operation, but it does not require a large torque any longer once the speed has reached the rated number of revolutions. Thus, in the induction motors according to the invention, after the rated number of revolutions has been reached, one of the stator windings is delta-connected by the switching device and the power supplying is made only to the one of the stator windings for continuous operation and, in this way, it is possible to carry out the operation with the power consumption being greatly reduced to below half the normal power consumption. That is, the reduction is made to about a half both in the current and the torque. However, the starting torque in this state is larger than the torque under the parallel star connections. Also, where the induction motor according to the invention is used in the starting operation of a crusher which has a speed reducer, since the torque is comparative low during the starting operation, it is possible for one of the stator windings to be delta-connected with the power supplying being made only to the one of the stator windings and, when the operation is for a comparatively large load, both the stator windings are parallel-delta-connected with the power supplying being made thereto, thus making it possible to draw out a large torque.

The method for the starting of operation in which the switching device operates such that, firstly the two stator windings are parallel-star-connected with the power supplying being made to both the stator windings, secondly either one of the stator windings is delta-connected with the power supplying being made only to the one of the stator windings, and thirdly the two stator windings are parallel-delta-connected with the power supplying being made to both the stator windings, is best suited to the operation of a pump or a fan.

The load in the above is a square-law decreasing load in which the gradual increase of the load is slow during the starting operation but the load becomes larger as the rated operation is approached. Conventionally, in such a starting operation, the switching is made from the star-connections to the delta-connections. The present invention follows the same switching pattern but, since the two sets of the stators and the rotors are provided, the two sets of the stators and the two sets of the rotors effectively function independently so that the starting torques during the starting operation period undergo ratio changes of $\frac{1}{3}$, $\frac{1}{2}$ and 1, whereby a soft start is realized and the starting operation characteristics are enhanced even with the reduction of, for example, load current and changing ratios of input.

The method for the starting of operation in which the switching device operates such that, firstly the two stator windings are parallel-star-connected with the power supplying being made to both the stator windings, secondly either one of the stator windings is delta-connected, and thirdly the two stator windings are parallel-delta-connected, is best suited to a square-law decreasing load such as a disaster prevention pump or a disaster prevention fan which becomes a load of a private power generating installation.

That is, when the starting is made by the parallel-star-connections, the ratio is $\frac{1}{3}$ both in the current and the torque as compared with that of the torque under the parallel-delta connections. The operation begins with the parallel-star-connections and, at the intersection with the load torque, one of the stator windings is delta-connected, followed by the switching to the delta-connections and the star-connections in parallel. At this switching, the current of the independent delta-connections is $\frac{1}{2}$ that of the parallel delta-connections and the current of the independent star-connections is $\frac{1}{6}$ that of the parallel-delta-connections so that the current ratio changes from $\frac{1}{3}$ to $\frac{4}{6}$. Further, the operation takes place by the parallel-star-delta connections and, at the intersection with the load torque, the switching is made to the next parallel-star-delta connections. At this time, the current ratio changes from $\frac{4}{6}$ to 1.

The current ratio change at the first switching is from $\frac{1}{3}$ to $\frac{4}{6}$, and this is incomparably small when compared with a large change of $\frac{1}{3}$ to 1 during the conventional star-delta switch starting operation. The current change to take place at the next switching is from $\frac{4}{6}$ to 1. When this switching takes place, the number of revolution has already approached close to the rated revolutions and the load current has been reduced to a small value, so that any influence this change from $\frac{4}{6}$ to 1 may bring about is extremely small as compared with that in the prior art. Similarly, the change in the input is reduced to an extremely small value as compared with that in the conventional star-delta switching. This is accountable, as already explained, by the fact that, since the two sets of the stators and the rotors are provided, the induction motors made up of the respective sets thereof effectively function to produce a consolidated torque. Moreover, assuming that each of them is constructed by a motor having the same capacity, the torque of each of them is $\frac{1}{2}$ that in the conventional example, so that the capacity of the electric circuits to be incorporated therein can be smaller and the cost is lower accordingly, thus offering advantages in both quality and cost aspects.

The method for the starting of operation in which the switching device is such that the two stator windings are respectively delta-connected with the power supplying being made switchably between both the two stator windings and one of the two stator windings, is best suited to a compressor in which the change of load is repeated between high and low. In the compressor, the operation and the stopping are repeated, or the high and low loads in the continuous operation are repeated.

Although a problem is not great in a small size compressor, when the size of the compressor increases, it requires a large size motor because, with the star-delta connections, the starting torque is not sufficient for the repetition of operation and stopping and, with the line-starting operation, such a repetition cannot be tolerated. Therefore, with the induction motor having a large torque characteristics (with two stator windings) and a half of the torque characteristics (with one of the stator windings), when the large torque is used only momentarily for the starting operation and is immediately switched to the half torque characteristics, it is possible to make a quick reduction of the large starting current to about a half thereof and, as a consequence, the temperature rise of the motor is smaller than that in the conventional line-starting operation alone.

Where a high load and a low load are repeated in the continuous operation, the conventional motor is operated with the same torque both when the load is high and low so that, irrespective of the low load, the power consumption is large. Among the prior art motors, there is a motor which is operated by using star-delta starting with the star-connections taking place while the load is low. However, in the star-delta switching used therein, since there is a large difference between the torque during the star-connection and the torque during the delta-connection and the stator windings are once totally cut from the power source, there arises a maintenance problem such as wearing of contacts. According to the present invention, since the motor used is an induction motor which has large torque and half torque characteristics and which is operated with the large torque (power being supplied to the two stator windings) when the load is high and with the half torque characteristics (power being supplied to one of the two stator windings) when the load is low, it is possible to carry out the power-saved operation when the load is low. Furthermore, for the switching between the large torque and the half torque, since there occurs no such problem as the disconnection of one of the stator windings from the power source and also since the current that flows to the other of the stator windings is about half the large torque, it is possible to enhance the reliability in the maintenance aspects such as the wearing of contacts.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
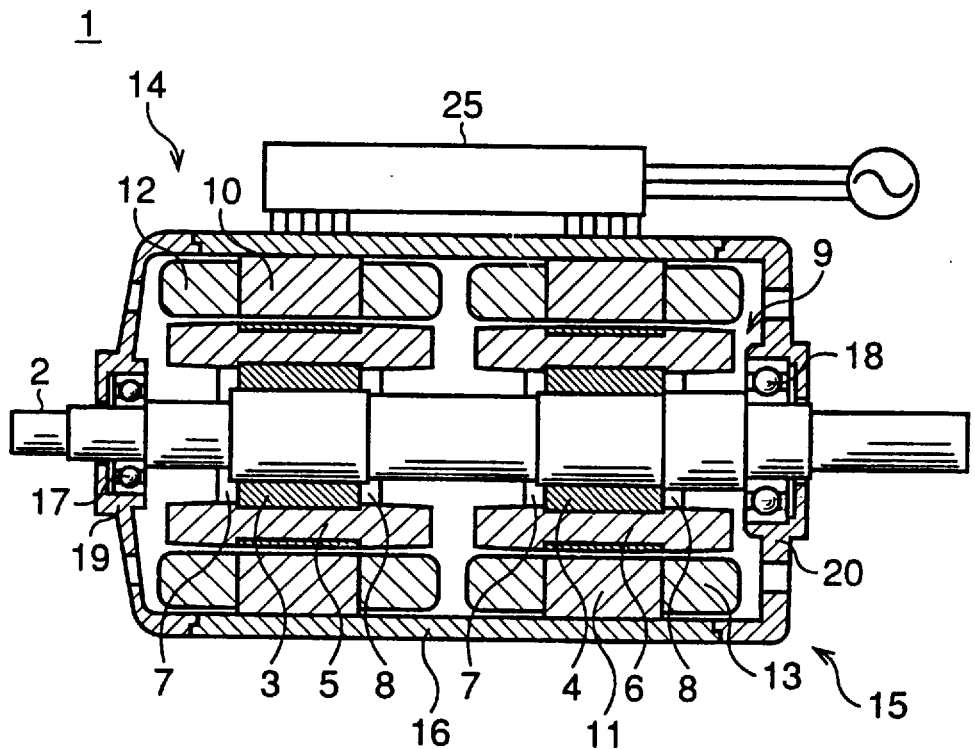
FIG. 1 is a sectional view of an induction motor as a driving means according to the invention.

A first preferred embodiment of the invention is explained with reference to FIG. 1. First the construction of an induction motor according to the invention is explained. In the induction motor represented by the numeral 1, two rotor cores 3 and 4 are axially mounted on a rotary shaft 2 with a predetermined space being provided therebetween, rotor conductors 5 and 6 are provided respectively on the rotor cores 3 and 4 and, at two sides of the rotor cores 3 and 4, the rotor conductors 5 and 6 are formed in a squirrel cage form by being short-circuited by short-circuiting rings 7 and 8, thereby forming a unitary rotor structure 9 having the two rotors. Further, stators 14 and 15 comprise stator cores 10 and 11 that are provided so as to surround the respective rotor cores 3 and 4 with predetermined spaces being provided therebetween and stator windings 12 and 13 that are wound respectively on the stator cores 10 and 11.

On the two sides of the machine frame 16 on which the stators 14 and 15 are provided, there are provided a bearing 19 containing bearing balls 17 and a bearing 20 containing bearing balls 18 and, due to these bearing balls, the shaft 2 of the rotor structure 9 that is axially supported rotates coaxially with the stators 14 and 15. Also, the stator windings 12 and 13 of the induction motor are connected to a switching device 25, and the induction motor forms a driving apparatus. According to the invention, in order to realize a compact induction motor, two rotors and two stators are provided in parallel in one machine frame, which can also be handled at an installation site in the same manner as for the conventional induction motor.

Figure 2A:
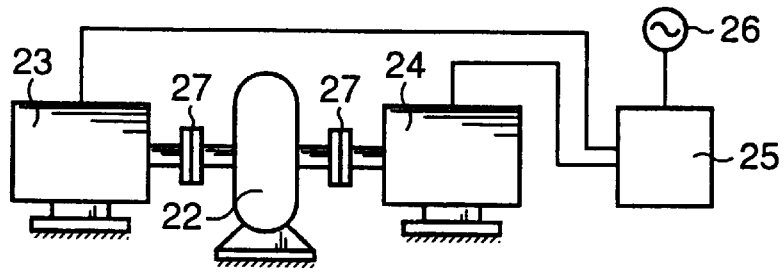
FIGS. 2A–2C are structural diagrams of another induction motor as a driving means according to the invention.

A second preferred embodiment of the invention is explained with reference to FIG. 2. FIG. 2 shows an induction motor structure as a driving apparatus in which two general purpose induction motors are used for driving a common load. FIG. 2A shows an arrangement in which the induction motors 23 and 24 are coupled to a load 22 from its two sides through respective coupling members 27, and the induction motors 23 and 24 are electrically connected to a power source 26 through a switching device 25.

Figure 2B:
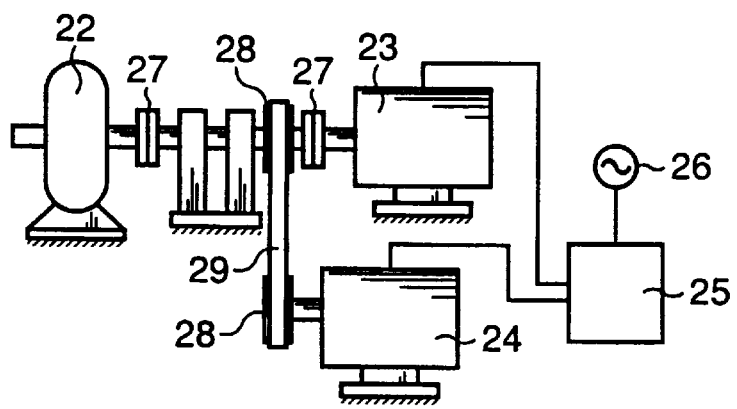

FIG. 2B shows an arrangement in which the induction motor 23 drives the load 22 through the coupling members 27, and the induction motor 24 drives the load through a pulley 28 and a belt 29. The connection between the induction motors 23 and 24 and the power source 26 is the same as that explained with reference to FIG. 2A.

Figure 2C:
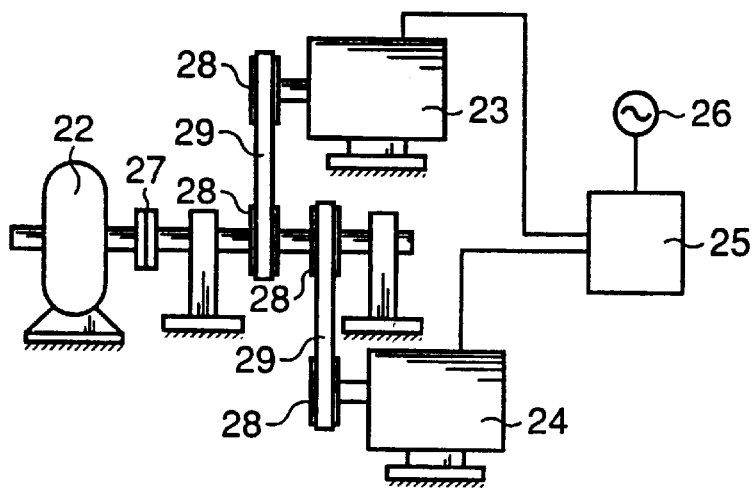

FIG. 2C shows an arrangement in which both the induction motor 23 and the induction motor 24 are coupled to the load 22 for driving it through the pulley 28 and the belt 29. Here, the connection between the induction motors 23 and 24 and the power source 26 is also the same as that explained with reference to FIG. 2A.

In the above cases, the motors required are two general purpose induction motors each of which may only have half the capacity that is required for the load. Thus, the cost of the induction motors, that is, the total cost of the two induction motors each having half the required capacity, will not exceed the cost of the induction motor having the required capacity.

Figure 3:
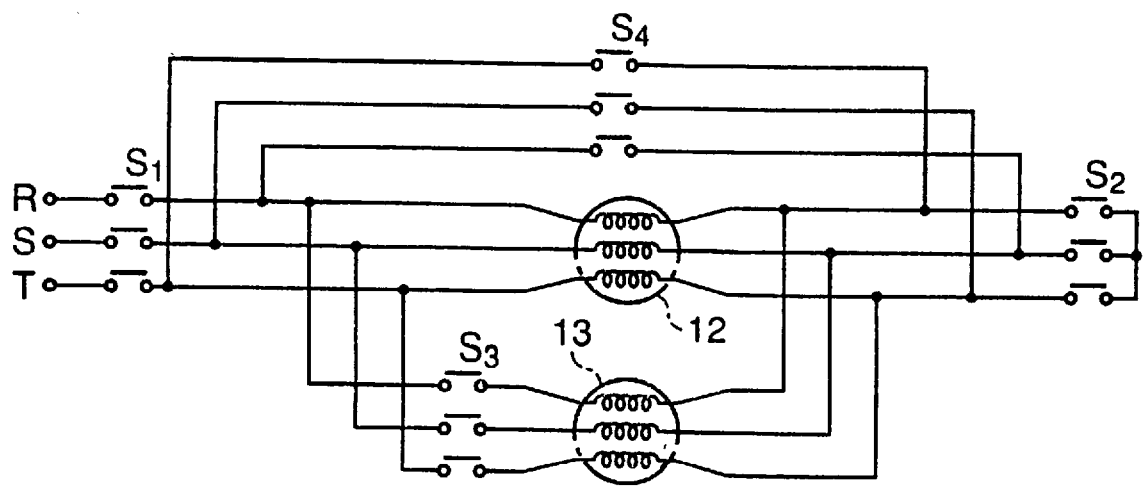
FIG. 3 is a diagram showing connections effective when a load having a large inertia is driven.

Now, FIG. 3 is referred to for explaining the switching device 25 which is constructed as a unit with the induction motor 1. In controlling the switching in this switching device, the effective controlling methods include those in which, by detecting changes due to the load to the induction motor in any of or in combination of values of revolutions, load currents, temperatures and times, the switching is made based on the detected values. Where the switching device employs a simple sequence and use is made of, for example, only the times or the revolutions for the switching operation, the handling of the switching device will be exactly the same as that for the prior art induction motor. It is also possible to use the switching device in combination with other control devices or control boards (not shown) for the controlling of the switching device.

Figure 4:
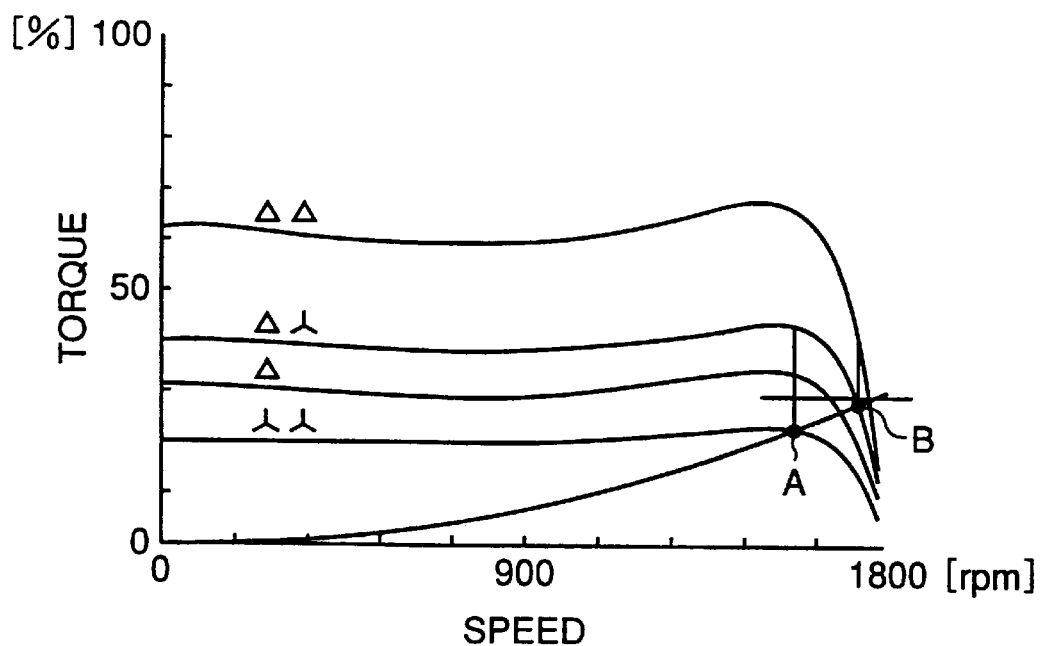
FIG. 4 is a graph showing torque characteristics obtained by the respective connections according to the invention.
Figure 5:
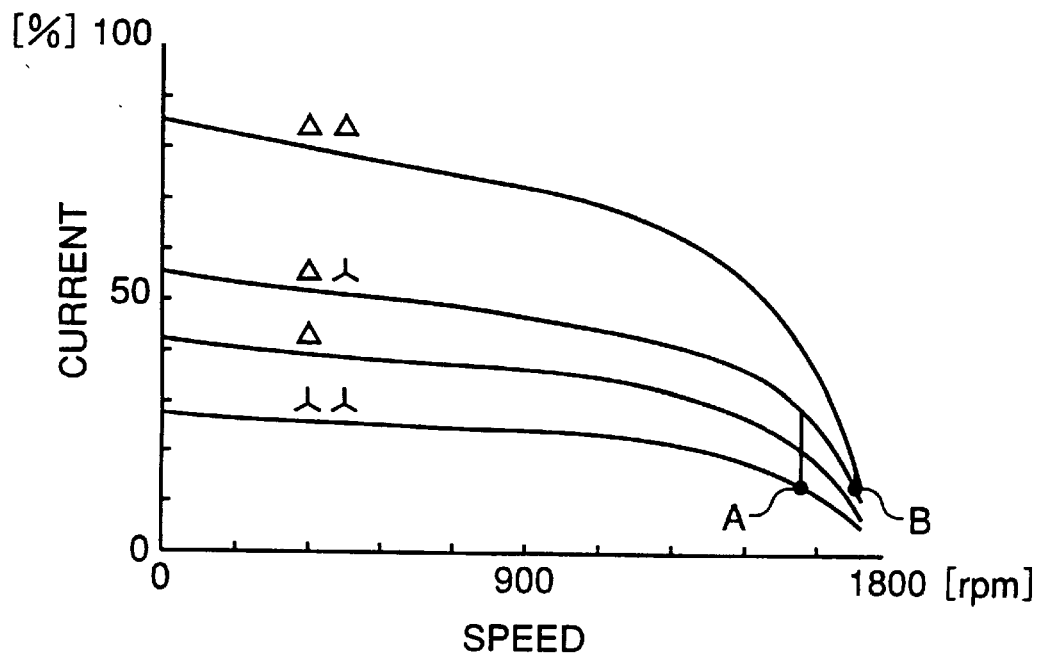
FIG. 5 is a graph showing current characteristics obtained by the respective connections according to the invention.
Figure 6:
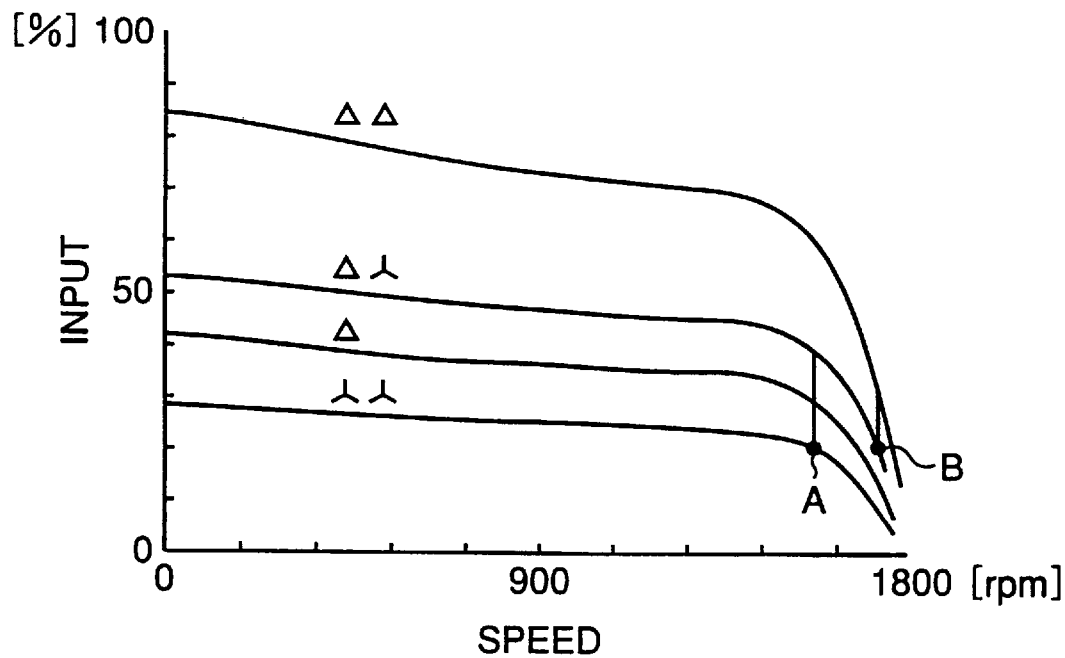
FIG. 6 is a graph showing input characteristics obtained by the respective connections according to the invention.
Figure 7:
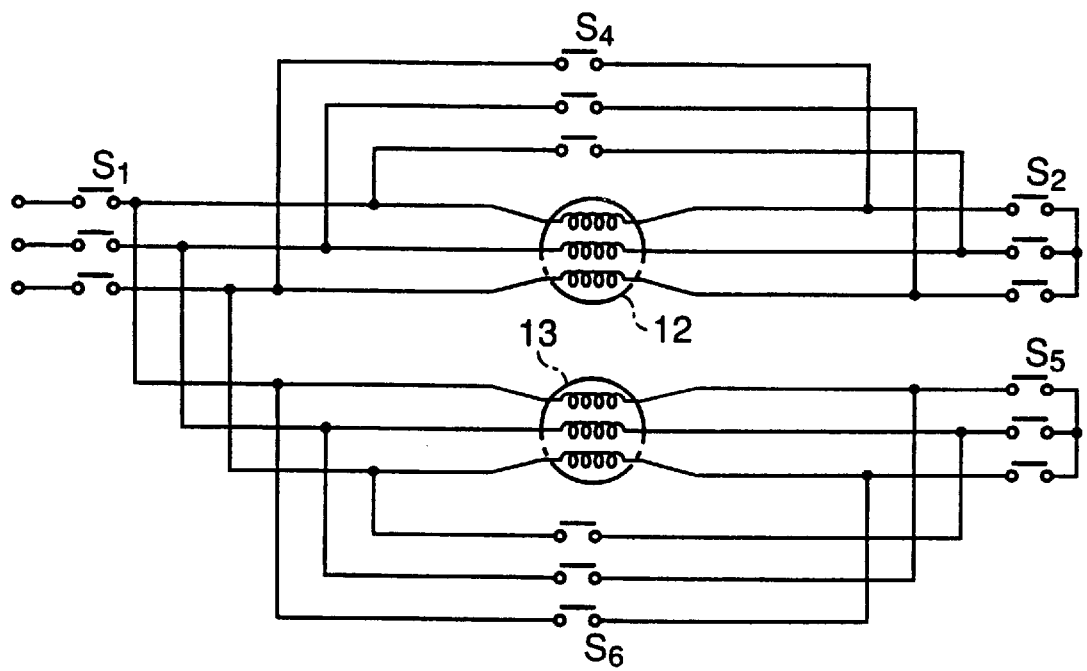
FIG. 7 is a diagram showing connections according to the invention that are effective when a load is a pump or fan used in an emergency private power generating installation.
Figure 8:
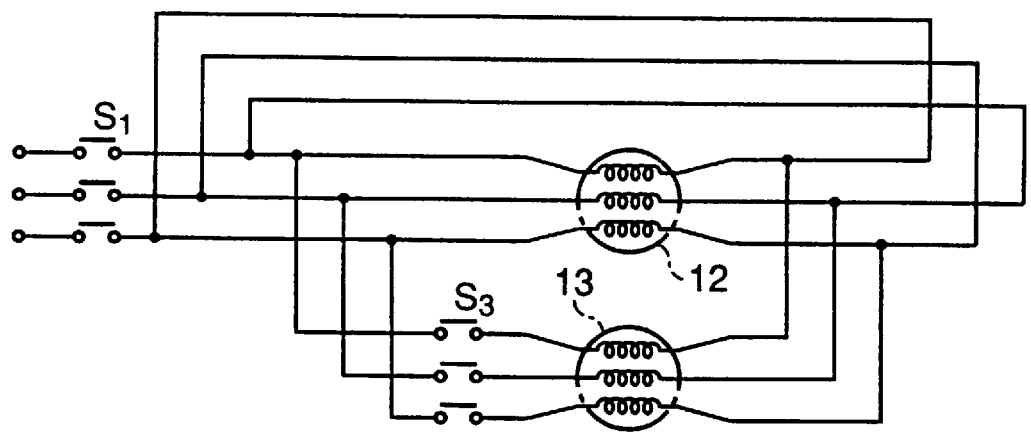
FIG. 8 is a diagram showing connections according to the invention that are effective when a load is one in which operation and stopping are repeated.
Figure 9:
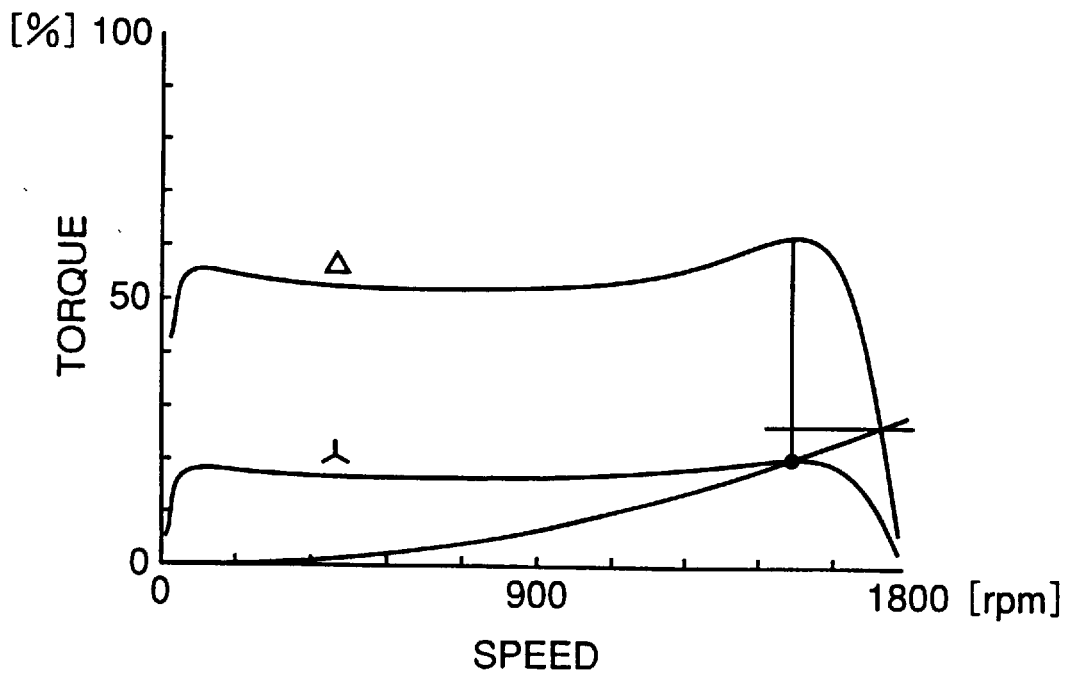
FIG. 9 is graph showing torque characteristics obtained by the star-delta switching in a conventional induction motor.
Figure 10:
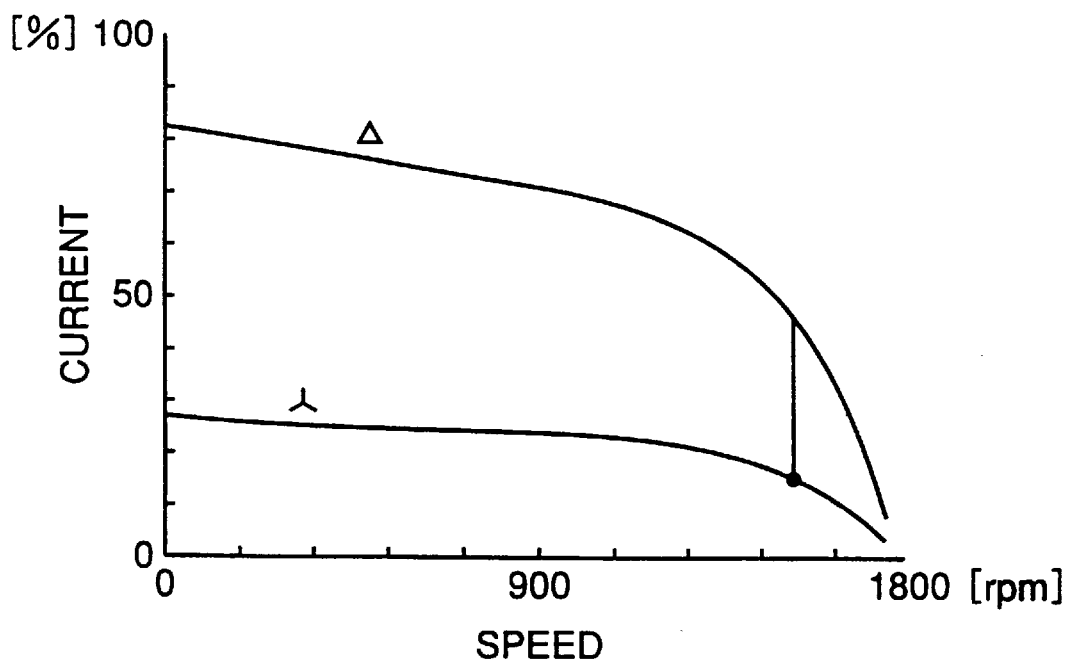
FIG. 10 is a graph showing current characteristics obtained by the star-delta switching in a conventional induction motor.
Figure 11:
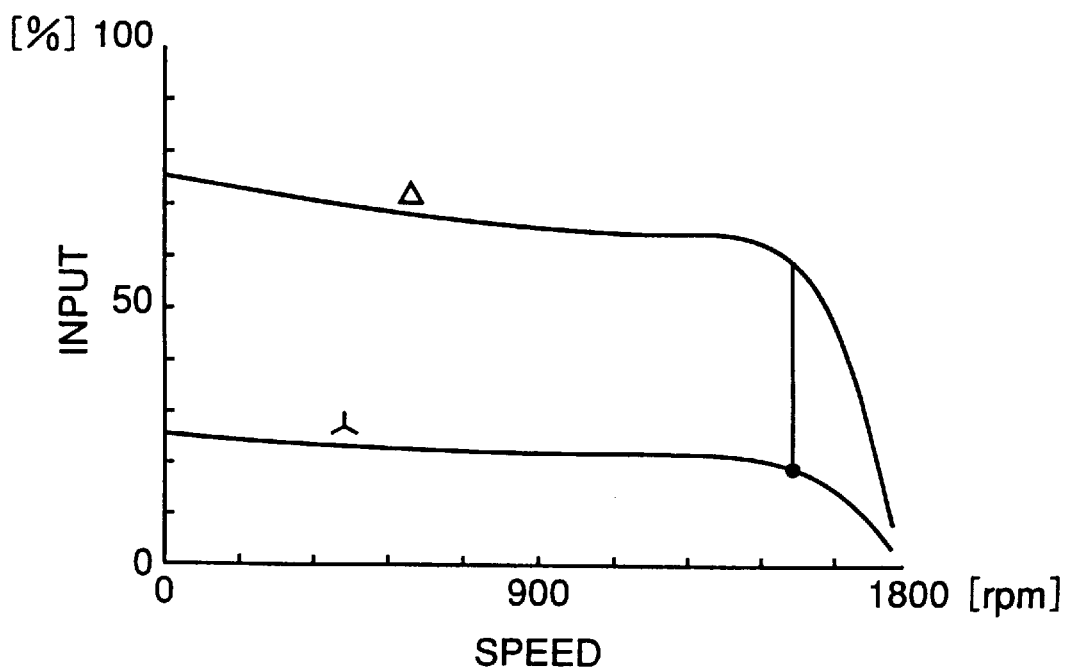
FIG. 11 is a graph showing input characteristics obtained by the star-delta switching in a conventional induction motor.

The stator windings 12 and 13 in the switching device 25 and various connections between the stator windings 12 and 13 and the switches S are shown in FIG. 3 and FIGS. 7 and 8. Changes in torques and currents due to the switching are shown in FIGS. 4 to 6. Since the two induction motors 23 and 24 and the switching device 25 shown in FIG. 2 are the same as those in the first embodiment of the invention, the explanation to follow hereunder is omitted for the second embodiment.

With reference to FIG. 3, one side of the 3-phase stator windings 12 is connected to power sources R, S and T through a main switch S1 while the other side of the 3-phase stator windings 12 is connected to a switch S2 for star-connections. The 3-phase stator windings 13 are connected in parallel with the stator windings 12 through a switch S3. Also, the stator windings 12 and 13 are both delta-connected at a switch S4. If the respective switches S are controlled by separate sequence circuits (not shown), it will be possible to automate the switching of the switches during the starting operation based on, for example, times or revolutions.

The above explained arrangement enables the parallel-delta-connections, parallel star-connections, single delta-connections and single star-connections. Excepting for single star-connections in which a torque is very small, three types of characteristics, that is, for torque, current and input characteristics are shown in graphs of FIGS. 4, 5 and 6. It will be seen therefrom that the arrangement can be applied to any loads in the same way as the prior art induction motor and that, of course, the line-starting operation is also possible. The induction motor as the driving apparatus according to the invention can be applied to any load torque, even to a torque with a large inertia or a torque with square-law decreasing characteristics, only by changing a switching sequence in the switching device. Moreover, since there are provided two sets of stators and two sets of rotors, if the power supplying is made only to one side of the 3-phase stator windings by the delta-connections, the motor can be started by an intermediate torque (single delta-connections in FIG. 4) which is, as shown in FIG. 4 by the single delta-connections, larger than the star-delta started torque of the prior art or the rated torque. Also, the starting current (single delta-connections) is so low as being about 1.5 times that of the parallel-star-connections and, moreover, continuous operation is possible. These characteristics are the ones which have not readily been achieved or realized by the prior art induction motors. The parallel-star-connections or the parallel delta-connections according to the invention are different from the connections in the prior art which are parallel connections of two circuits within one stator and, since they are independent star-connections and delta-connections of the induction motors each having substantially half the rated output, there is no interference in magnetic circuits arranged in parallel, or there is no influence to the changes in the magnetic characteristics and torque characteristics caused by the power supplying only to one of the stator windings. Moreover, the switches S2, S3, S4 are, with the exception of the main switch S1, switches each having a capacity half that of prior art switches, and also the number of these switches can only be two to five (which is also true in other embodiments) and such switches can be realized at a low cost.

Now, the explanation is made for the case wherein a load having a large inertia is started and operated by the induction motor having the connections as shown in FIG. 3. In this case, in the state in which all the switches are opened, the switching operates such that firstly the switches S3 and S4 are closed and the two 3-phase stator windings 12 and 13 are parallel-delta-connected. Then, the power supplying is made to the two 3-phase stator windings 12 and 13 and, when the rated number of revolutions is reached, the switch S3 is opened and only one 3-phase stator winding 12 is delta-connected (single delta) and the power supplying is made only to this one 3-phase stator winding. The torque, current and input characteristics obtained in the respective connections are shown in FIGS. 4, 5 and 6.

A load having a large inertia as in presses or crushers requires a large torque for the starting operation, but such a large torque is no longer required once the rated number of revolutions is reached. Thus, by closing the switches S3 and S4, the 3-phase stator windings 12 and 13 are started by the parallel-delta connections as shown in FIG. 3 and, after the rated number of revolutions is reached, the induction motor operates such that, by opening the switch S3 by the switching device 25, only one 3-phase stator winding 12 is delta-connected and is switched to the continuous operation (single delta-connections in FIG. 4) with the power supplying being made only to this one 3-phase stator winding. In this way, during the operation, it is possible to save the power to lower than the ordinary rated current. That is, both the current and the torque can be reduced to about a half. However, the starting operation torque is increased to a torque larger than the rated torque obtained by the parallel-delta connections.

Contrary to the above, in the starting operation of the crusher in which a speed reducing device is used, the starting torque is comparatively low so that the starting can be made by closing the switch S4 and delta-connecting one 3-phase stator winding 12 with the power supplying being made only to this one 3-phase stator winding (single delta-connections in FIG. 4). For the operation of a comparatively large load, both the 3-phase stator windings 12 and 13 are delta-connected (parallel-delta connections in FIG. 4) with the power supplying being made thereto and, in this way, a large torque can be obtained.

Now, the explanation is made for the case wherein a pump or fan which is a square-law decreasing load is started by the induction motor as a driving means, in which the connections are made as shown in FIG. 3. In this case, in the state in which all the switches are opened, the switching operates such that firstly the switches S3 and S4 are closed and the two stator windings 12 and 13 are parallel-delta-connected with the power supplying being made thereto by closing the switch S1. Secondly, the switches S2 and S3 are opened, the switch S4 is closed and one stator winding 12 is delta-connected with the power supplying being made to this one stator winding 12. Thirdly, the switch S3 is closed and the two stator windings 12 and 13 are parallel-delta-connected and the power supplying is made to both the stator windings 12 and 13.

A pump or a fan is a square-law decreasing load in which the gradual increase of the load is slow during the starting operation but the load becomes large as the rated operation is approached. Conventionally, in such a starting operation, the switching is made from the star-connections to the delta-connections. The present invention follows the same switching pattern but, since the two sets of the stators and the rotors are provided, there is a large difference from the star-delta switching which is made by a conventional single induction motor. That is, the two sets of the 3-phase stator windings 12 and 13 effectively function independently so that the ratios of the currents and the torques with respect to the ultimate parallel-delta-connections during the starting operation are ⅓ during the parallel-star-connection operation (parallel-star connections in FIG. 4), ½ during the independent delta-connection operation (single delta-connections in FIG. 4), 1 during the parallel-delta-connection operation (parallel-delta-connections in FIG. 4), and these changes ensure the realization of a soft start and largely improve the starting characteristics from those of the conventional star-delta starting operation.

FIG. 7 shows a second example of connections in which the stator windings 12 and 13 and the switches S are connected in the switching device 25. Here, one side of the 3-phase stator windings 12 is connected to power sources R, S and T through a main switch S1 while the other side of the 3-phase stator windings 12 is connected to a switch S2 for star-connections. The 3-phase stator winding 12 is delta-connected through the switch S4. One side of the 3-phase stator windings 13 is connected to the power sources R, S and T through the 3-phase stator winding 12 through the switch S1. The other side of the 3-phase stator winding 13 is connected to a switch S5 for star-connections. Also, the 3-phase stator winding 13 is delta-connected by a switch S6. Therefore, the 3-phase stator winding 12 results in star-connections by the switch S2 and in delta-connections by the switch S4. Further, the 3-phase stator winding 13 results in star-connections by the switch S5 and in delta-connections by the switch S6.

Next, the explanation is made for the case in which, by using the induction motor with the switching device as shown in FIG. 7, the starting operation takes place in a square-law decreasing load such as a pump or a disaster prevention fan which becomes a load of a private power generating installation. In this case, the starting is made by the switching device in the following manner. In the state in which all the switches are opened, firstly the switches S2 and S5 are closed so that two stator windings 12 and 13 are parallel-star-connected and then the switch S1 is closed so that the power supply is made to the two 3-phase stator windings 12 and 13. Secondly, the switch S2 of one stator winding 12 is opened and is delta-connected by closing the switch S4. Thirdly, the switch S5 of the 3-phase stator winding 13 is opened and the switch S6 is closed whereby the two 3-phase stator windings 12 and 13 are parallel-delta-connected.

The torque changes by the switching of the connections and the resulting current and input characteristics are as follows.

That is, when the starting is made by the parallel-star-connections, the ratio becomes ⅓ both in the current and the torque as compared with those in the parallel-delta connections. The operation takes place in the parallel-star-connections and, at the intersection A (FIG. 4) with the load torque, one side 3-phase stator winding 12 is delta-connected and is switched in parallel with the star-connections of the other side 3-phase stator winding 13. At the switching at this time, the current of the 3-phase stator winding 12 of the independent delta-connections is ½ of that in the parallel-delta-connections and that of the 3-phase stator winding 13 of the independent delta-connections is ⅙, and this means that the current changes from the ratio ⅓ to the ratio ⅙. Further, the operation takes place under the parallel-star-delta-connections and, at the intersection B with the load torque, the switching is made to the next parallel-delta-connections. The current then changes from the ratio ⅙ to the ratio 1.

The current change at the first intersection A is from ⅓ to ⅙. This change is incomparably smaller than a large change from the ratio ⅓ to the ratio 1 in the conventional star-delta switching start operation. At the next intersection B, the current change is from ⅙ to 1 and, since this switching takes place at a point when the speed is already close to the rated number of revolutions, the value of the load current is very small so that any influence that the change from the ⅙ to 1 may bring about is very small when compared with the prior art. Also, if, by the switching device 20, the torque by the single delta-connections alone is added to the next torque of the parallel-star-connections, the change ratios of the input and the current can further be made smaller. These advantages result because, as already explained, the two sets of 3-phase stator windings constitute two induction motors which function effectively as a unit for producing the necessary torque. Furthermore, if the two motors are of the equal capacity, the rated capacity of each of them can be ½ that of the conventional motor, and the circuits to be incorporated may employ those of proportionally lower capacity and cost so that there are significant advantages in both the aspects of performance and cost.

Finally, FIG. 8 is a connection diagram showing, as a third example, the connections of the stator windings 12 and 13 and the switch S in the switching device 25. That is, one side of the 3-phase stator winding 12 is connected to the power sources R, S and T through the main switch S1, and the other side of the 3-phase stator winding 12 is connected to the one side of the 3-phase stator winding 12 for the delta-connections. Also, the 3-phase stator winding 13 is connected in parallel to the 3-phase stator winding 12 through the switch S3, resulting simultaneously the 3-phase stator winding 13 in the delta-connections.

Next, the explanation is made for the case wherein a load such as a compressor in which the repetition is made for operating and stopping or for high and low is driven by the induction motors with switching devices as shown in FIG. 8. In this case, by the switching device 20, the starting operation is made by closing the switches S1 and S3 and delta-connecting the 3-phase stator windings 12 and 13 and, immediately after the starting, the switch S3 is opened and the power supplying is switched only to the 3-phase stator winding 12 out of the two 3-phase stator windings 12 and 13. Where the load is high, the switch S3 is closed and the power supplying is made to the two 3-phase stator windings 12 and 13 and, where the load is low, the switch S3 is opened and the power supplying is made only to the one 3-phase stator winding 12.

Although a problem is not significant in a small size compressor, when the size of the compressor increases, it requires a large size motor because, with the star-delta-connections, the starting torque is not sufficient for the repetition of operation and stopping and, with the line-starting operation, such a repetition cannot be tolerated. Therefore, with the induction motor having a large torque (two 3-phase stator windings 12 and 13) and a half of the torque characteristics (one 3-phase stator winding 12), when the large torque is used only momentarily for the starting operation and is immediately switched to the half torque characteristics (single delta-connections in FIG. 4), it is possible to make a quick reduction of the large starting current to about a half thereof and, as a consequence, the temperature rise of the motor is smaller than that of the conventional line-starting operation alone .

Where a high load and a low load are repeated in the continuous operation, the conventional motor is operated with the same torque both when the load is high and low so that, irrespective of the low load and even when no air is used, the power consumption is large. Among the prior art motors, there is a motor which is operated by using star-delta starting with the star-connection taking place while the load is low. However, in the star-delta switching used therein, since there is a large difference between the torque during the star-connection and the torque during the delta-connection and the stator windings are once totally cut from the power source, there arises a maintenance problem such as wearing of contacts. According to the present invention, since the motor used is of an induction motor structure which has large torque (parallel-delta-connections) and half torque characteristics (single delta-connections) and which is operated with the large torque when the load is high and with the half torque characteristics (power being supplied to one of the two stator windings) when the load is low, it is possible to carry out the power-saved operation when the load is low. Furthermore, for the switching between the large torque and the half torque, since there occurs no such problem as the disconnection of the 3-phase stator winding 12 from the power source and also since the current that flows to the other stator winding 13 is about half the rated torque, it is possible to enhance the reliability in the maintenance aspects such as the wearing of contacts of the switches S.

In the above embodiment, by using, for example, the connections as shown in FIG. 7, if the switch S2 is closed with the connections being changed to single star-connections, the torque characteristics will become half those of the parallel star-connections shown in FIG. 4, thus providing the torque characteristics which are better suited to the square-law decreasing characteristic load.

The conventional induction motor of the kind to which the present invention relates has been such that it consumes unnecessary power for a large inertia or that, although the motor is for general purposes, a special starting device is required in order to limit the starting current, thus making the motor a special use motor and no longer a general purpose motor. The present invention provides an induction motor which is low in cost and which can be used efficiently for any purposes while fully exhibiting its capability as an induction motor, that is, as a motor that can cope with a large inertia without requiring any such special high cost starting device as required in the conventional general purpose motor, as a motor that can be used in a private power generating installation, and as a motor that can be used in a compressor that repeats starting and stopping operations and is differently used depending on a loaded state and an unloaded state. The present invention also provides a method for starting the operation of the induction motor.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for supplying power to an induction motor having a first power generation means constituted by a first rotor and a first stator which surrounds said first rotor and on which a first stator winding is wound and a second power generation means constituted by a second rotor and a second stator which surrounds said second rotor and on which a second stator winding is wound, said first and second power generation means being connected to a common load, said method comprising the following sequential steps:

a first step of supplying power to said first and second stator windings after both the windings are respectively connected in a star-form;

a second step of supplying power to said first and second stator windings after a connection of said second stator winding is changed into a delta-form while a connection of said first stator winding remains as the star-form; and a third step of supplying power to said first and second stator windings after the connection of said first stator winding is changed into a delta-form while the connection of said second stator winding remains as the delta-form.

2. A method for supplying power to an induction motor according to claim 1, wherein said induction motor is a single motor in which said first and second rotors are mounted on a common rotary shaft with a predetermined space being provided therebetween and said first and second stators are surroundingly facing said first and second rotors, respectively.

3. A method for supplying power to an induction motor according to claim 1, wherein said induction motor comprises a first induction machine formed by said first rotor and said first stator and a second induction machine formed by said second rotor and said second stator.

* * * * *